W. F. DEISTER.
SLIME CONCENTRATOR.
APPLICATION FILED APR. 30, 1912.
1,037,212.
Patented Sept. 3, 1912.
5 SHEETS—SHEET 3.
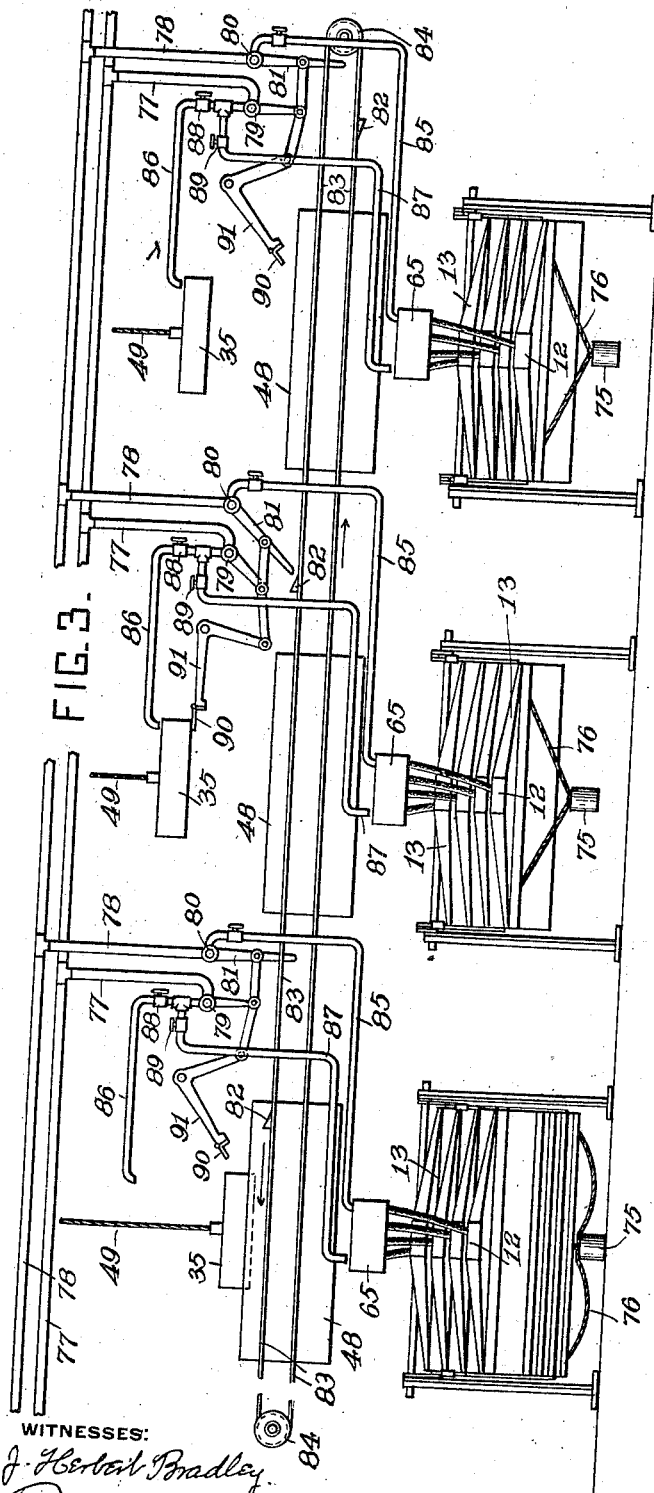
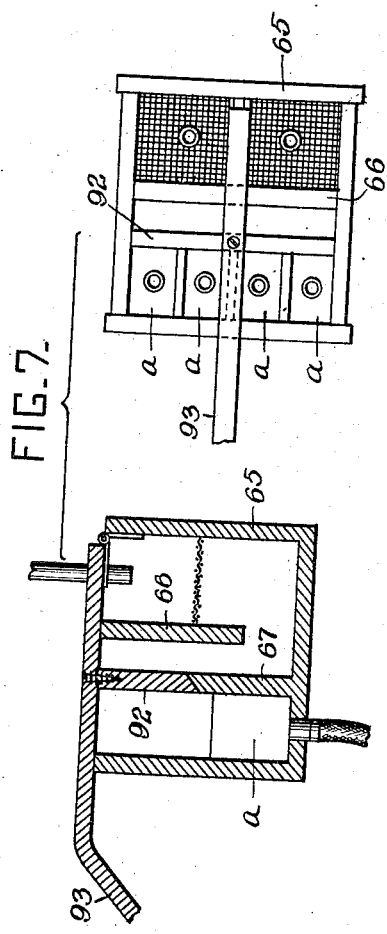

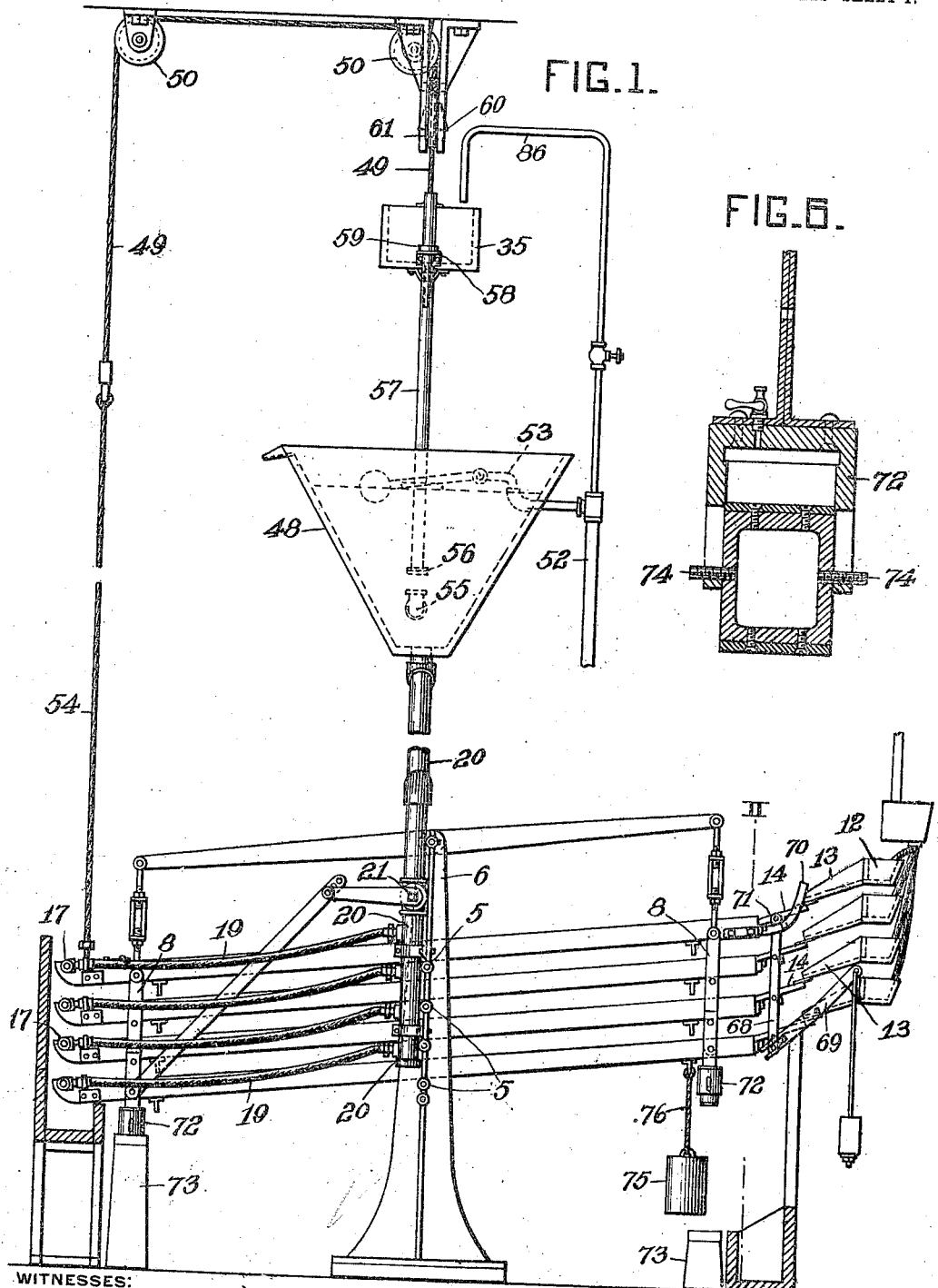

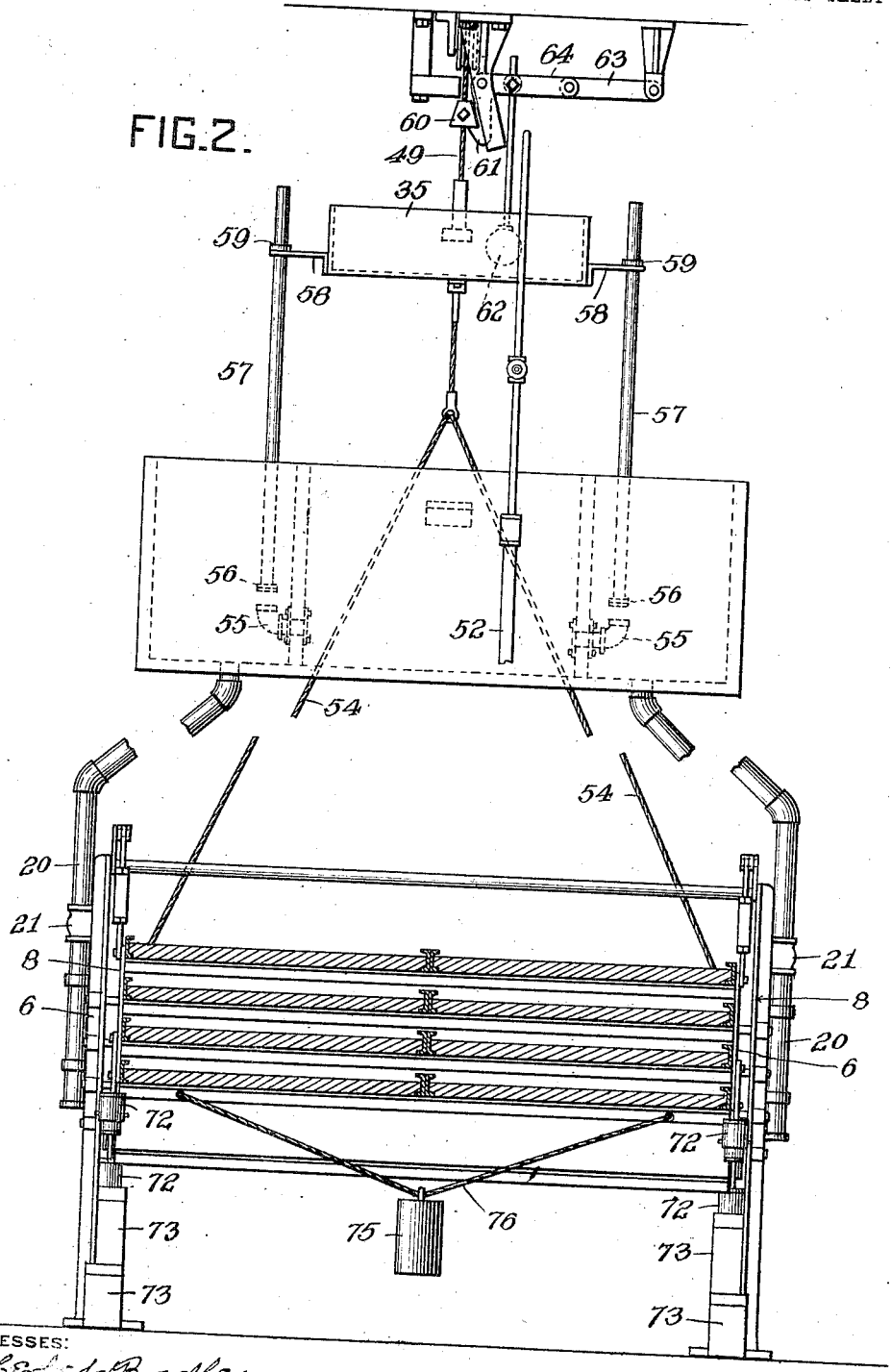

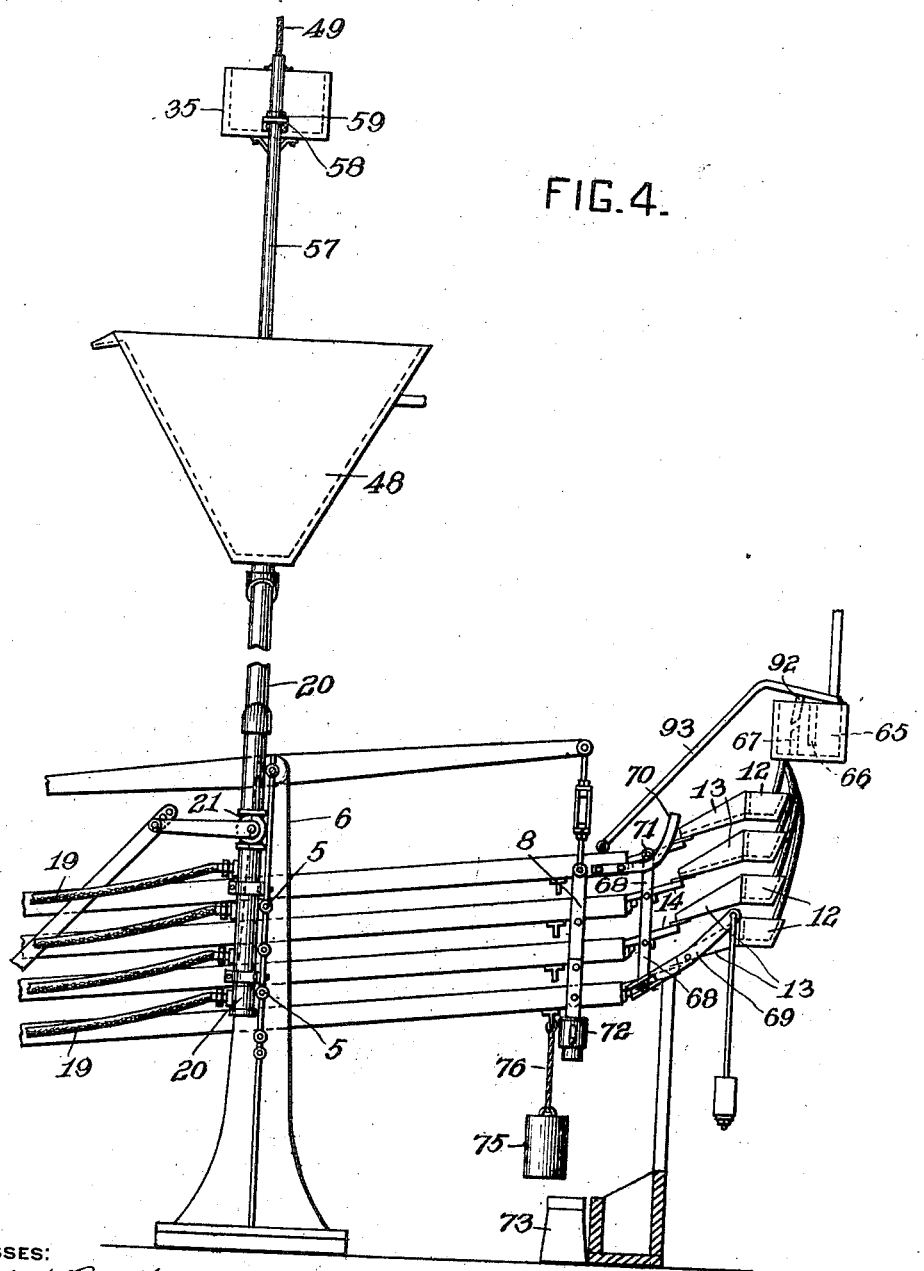

W. F. DEISTER.
SLIME CONCENTRATOR.
APPLICATION FILED APR. 30, 1912.
1,037,212.
Patented Sept. 3, 1912.
5 SHEETS—SHEET 5.
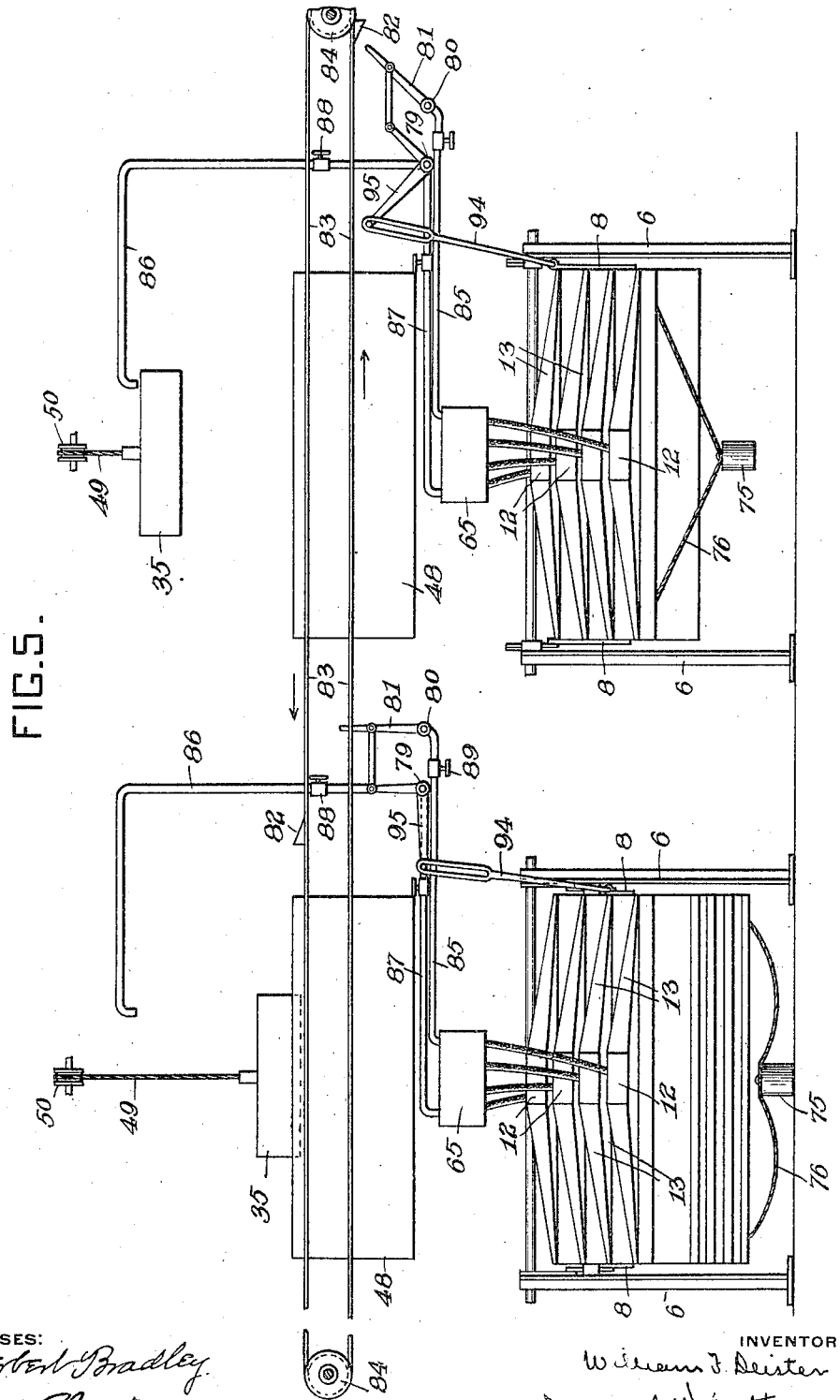
FIG. 5.
WITNESSES:
INVENTOR
William F. Deister
by Dennis S. Wolcott Atty

UNITED STATES PATENT OFFICE.

WILLIAM F. DEISTER, OF FORT WAYNE, INDIANA.

SLIME-CONCENTRATOR.

1,037,212. Specification of Letters Patent. Patented Sept. 3, 1912.

Application filed April 30, 1912. Serial No. 694,289.

*To all whom it may concern:*

Be it known that I, WILLIAM F. DEISTER, residing at Fort Wayne, in the county of Allen and State of Indiana, a citizen of the United States, have invented or discovered certain new and useful Improvements in Slime-Concentrators, of which improvements the following is a specification.

The invention described herein relates to certain improvements in the type of slime concentrators shown and described in Letters Patent No. 1,007,074, dated October 31st, 1911 and 1,010,350 dated November 28th, 1911.

The invention is hereinafter more fully described and claimed.

In the accompanying drawings forming a part of this specification Figure 1 is a side elevation of a slime concentrator embodying my improvements; Fig. 2 is a sectional elevation on a plane indicated by the line II—II Fig. 1; Fig. 3 is an elevation showing a series of my improved table in combination with means for controlling the feed of slime to the tables, and the flow of water to the operating or controlling tank, and for dressing the tables; Fig. 4 is an end elevation of the plant shown in Fig. 3; Fig. 5 is a view similar to Fig. 3 illustrating certain modifications; Fig. 6 is a sectional detail of one of the cushioning cylinders; Fig. 7 shows a transverse section and a top plan view of a slime feeding box.

As set forth in said Letters Patent No. 1,007,074, the several decks are pivotally supported about midway of their length on shafts 5 which are mounted on posts or columns 6. The decks forming a table are connected so as to move in unison by straps 8 arranged adjacent to the ends of the decks. Suitable means as boxes 12 having fan shaped directing trays 13 are arranged at one end of the table for feeding the material onto the decks, which when in feed position incline downwardly at a suitable angle from the trays. Pipes 17 having perforations or nozzles are arranged across the ends of the decks in suitable relation to the upper surfaces thereof to effect a washing off of deposits. These pipes are connected by flexible tubes 19 to a water supply pipe 20 provided with a controlling valve 21, adapted to be opened and closed as the table moves to and from washing position, as fully set forth in the patents referred to. In the form of apparatus described and shown in Patent No. 1,007,074 the table is shifted from feeding position to washing position and back to feeding position by a motor driven mechanism and consequently without any regard to the richness of the materials treated. While such table shifting mechanism may be employed in connection with the apparatus set forth herein it is preferred to employ the construction shown in Letters Patent No. 1,010,350. While any of the arrangements of controlling or operating tanks 35 shown in said patent may be employed, the construction shown in Fig. 5 of the patent is preferred. In this form of apparatus the controlling or counter balancing tank 35 is attached to one end of a rope 49 passing over guide pulleys 50 and having its opposite end connected to the table preferably by means of a bridle 54 extending to the sides of the table adjacent to one end, as shown in Fig. 2.

As set forth in Patent No. 1,010,350 the pipe 20 may be connected direct to a supply pipe but better results are obtained where the supply of water is scant, by connecting the pipe 20 to a reservoir 48, in which a supply of water in excess of that required for a washing of the decks may be stored. This reservoir is divided into three compartments as shown in Fig. 2, the supply pipe 52 being arranged to discharge through a float controlled valve 53 into the middle compartment which preferably has a capacity approximately equal to the combined capacities of the other two compartments. The end compartments, which are connected to the pipes 20 arranged on opposite sides of the table, have a capacity at least sufficient to effect a flushing or washing of the decks of the table and are connected by pipes 55 to the central compartment. The flow of water through these pipes is controlled by valves 56 on stems 57 which extend up through brackets 58 on the controlling tank 35. The brackets engage shoulders 59 on the stems when the tank 35 rises, its controlling liquid having been discharged, and the table moves to feed position as shown in Fig. 1, thereby raising the valves 56 and permitting the end compartments of the reservoir to be filled while the slime is flowing over the decks. When the tank 35 is so charged as to move down and shift the table to washing position, at which time the valves 21 are opened, the valves 56 will drop down and close the pipes 55. This construction will prevent the waste of the washing water in case due to the continuance of flow of washing water after the table begins its return movement to feed position, it will be understood that relative movements of the several parts are so adjusted that the end compartments are discharged onto the table, while the controlling tank is being discharged.

The flow of water into the controlling tank 35 is regulated to maintain the table in feed position for a certain definite time dependent on the quantity of values contained in the slime. The richer the slime in values the shorter should be the feed period. As stated in Patent No. 1,010,350 the end of the table opposite that onto which the slime is fed is the heavier, so that the table when free to do so will automatically move to feed position, and in order to shift the table to washing position the tank 35 and its contents should not only overbalance the excess of weight of one end of the table, but also the weight of the accumulating values to a predetermined point. In the construction shown in said patent, the table will not be shifted until the weight of the tank and its contents exceeds that of one end of the table and the values thereon. Hence if the flow of water into the tank is regulated for a certain richness of slime, and there should be an increase in values unnoticed by the attendant, the table would remain too long in feed position and values would escape from the table. In order to insure the movement of the table at the end of a predetermined period, and regardless to an extent of the accumulated values, provision is made for locking the controlling tank in its elevated position, said lock being controlled by the water in the tank. While other suitable means may be employed, the construction shown is well adapted for that purpose. A block 60 is secured to the rope 49 in such position as to be engaged by a pivotally mounted dog 61 when the tank is in its upper position. This is adapted to be shifted when the water in the tank has reached a predetermined level. A convenient means to this end consists of a float 62 having a stem connected to the free end of a lever 63 to which is pivotally connected the end of an arm 64 secured to the dog, as shown in Fig. 2. By properly adjusting the position of the float in the tank the dog will be shifted out of engagement with the block. The adjustment of the float and the regulation of the flow of water are preferably made with reference to the richness of the slime, and care should be taken that when the dog is shifted there will be sufficient water in the tank to insure its complete downward movement to washing position regardless of the quantity of values accumulated on the table.

In order to insure an equal flow of the slime to all of the decks forming a table, it is fed into one side of a box 65 and flows under a baffle 66 and over a second baffle 67 into compartments *a* corresponding in number to the decks employed. The slime flows from these compartments through the several troughs 12 over the distributing trays 13 and aprons 14 onto the decks. The aprons 14 have one end hinged to the trays 13 so that when the table is moved to washing position their free ends will drop to a position to discharge any slime or water flowing from the troughs into a launder. The aprons rest at points adjacent to their free ends on pins carried by straps 68, which are pivotally connected to weighted levers 69. The weights on the levers will not fully counter-balance the aprons so the free ends of the latter when free to move will always drop. The levers are so shaped that the weights will become more effective as the aprons are raised to normal or operative position, as shown in Fig. 1. The aprons are raised to direct the slime onto the decks when the table is shifted to feed position by curved arms 70 on the table engaging rollers 71 on the straps.

In order to prevent severe jars to the table when shifted from one position to the other suitable cushioning devices are employed preferably arranged at the corners of the table. A convenient means for this purpose consists of cylinders 72 closed at one end and pistons arranged therein. The cylinders are provided with suitable valves at their closed ends to control the escape of air as the pistons strike against the blocks 73. The outward movements of the pistons are limited by pins 74 on the pistons projecting into slots in the walls of the cylinders.

As will be readily understood the movement of the table from washing to feed position will be a progressively accelerating one, the weighted end of the table moving down. As will be understood, the sudden checking of such accelerated movement, especially when employing elastic cushioning devices, will cause a rebound of the table, thus interfering with the desirable regular and uniform flow of slime. In order to retard such movement without entirely checking it, a weight 75 is attached by a rope 76 or other flexible means to the feed end of the table. This rope is made of such a length that the weight will not be lifted from the floor or other support until the table has nearly completed its movement.

It is generally customary to employ a large number of these tables in a plant, and to arrange them in series, the tables of each series being arranged either side by side, or end to end as desired. When thus arranged it is preferred that the tables of each series should operate automatically and in proper sequence.

While not limiting myself to the mechanism shown it is believed that it is well adapted for the purpose.

Pipes or troughs 77 and 78 for the slime and water are arranged along the line of tables said pipes or troughs being provided with branches extending to valve mechanisms 79 and 80 for each table. One of these valve mechanisms as 80 is provided with an operating lever 81 extending into the path of movement of one or more blocks 82 secured to the endless sprocket chain 83 passing around sprocket wheels 84. One of these sprocket wheels is driven at a speed dependent on the richness in values of the slime to be treated. The other valve mechanism 79 has an operating lever or handle connected by a link to the lever 81, so that said valves will be shifted simultaneously. The valves as 80 are normally open and are connected by pipes 85 to the slime boxes 65 while the valves 79 are normally closed and are connected by pipes 86 and 87 to the operating tank 35 and to the slime boxes 65. The normal positions of the valves 79 and 80 are closed and open respectively, as shown to the right in Fig. 3, so that slime will flow onto the decks of the table, which is at that time in feed position. The blocks 82 are as before stated so spaced on the sprocket chain and the latter is driven at such a speed that after the slime has flowed over the decks for a predetermined time, a block will strike and shift the lever 81 thereby closing the slime controlling valve 80 and opening the water valve 79, thereby permitting water to flow into the controlling tank 35 and the slime box 65. The pipes 86 and 87 are provided with regulating valves 88 and 89 which are so set that the controlling tank will be filled by the time sufficient water has flowed into the slime box and thence over the decks to effect the desired dressing. As the controlling tank moves down to shift the table to washing position it strikes a pivoted dog 90 on one arm of a bell crank lever 91, which has its opposite arm connected to the operating levers of the valves 79 and 80. By this movement of the tank 35 the valves 79 and 80 are shifted to closed and open positions respectively, and the table moves to washing position. By this movement of the table a gate 92 in the slime box is permitted to close, thus preventing the slime from flowing into the distributing compartments a of the box, although it is free to flow into box on the opening of the valve 80. The gate 92 which when lowered forms a tight joint with the upper edge of the baffle 67, is carried by an arm 93 pivoted to the box or other suitable support and extends forward so as to be supported and hold the gate in open position by the table when in feed position. On the return of the table from washing to feed position the gate is raised and there will be a flow of slime with and along the decks of the table until the valve 80 is again closed by a block on the endless chain.

It is characteristic of the construction and combination shown in Fig. 3 that after the several adjustments have been made and the endless sprocket chain set in motion that the operation of the table will be entirely automatic, the feeding, dressing and washing occurring in orderly sequence each operation continuing for definite periods for which adjustment had been made.

As shown in Fig. 5 the shifting of the valves 79 and 80 to stop the flow of water and permit the renewal of the flow of slime, may be effected by the table as it moves to washing position. In this construction an arm 94 is pivotally connected at one end to the table while its opposite end is slotted for the reception of a pin on a lever 95 for operating the valves. To the right in Fig. 5 the several parts are shown in the positions to which they have been shifted by a block on the endless chain, the table being in feed position, the slime valve closed and the water valve 79 opened, so that water is flowing into the slime box to "dress" the table, and also into the controlling tank. As soon as the latter is properly charged it will move down and shift the table to washing position. This movement of the table pulls down the arm 94 thereby shifting the valves 79 and 80 to closed and open positions. When the table is returned to feed position the arm 94 is raised thus bringing the pin on the lever 95 to the lower end of the slot on the arm 94, so that the valves can be reversed at the proper time by the endless chain.

I claim herein as my invention:

1. In an apparatus for treating slime, the combination of a pivotally mounted table normally inclined in the direction of flow of the slime and having a bias when shifted to return to normal position, and means adapted to offer a resistance sufficient to substantially retard the return movement.

2. In an apparatus for treating slime, the combination of a table pivotally mounted, and normally inclined in the direction of flow of the slime and having a bias after being shifted to return to normal position, and means operative as the table approaches normal position to offer a resistance sufficient to substantially retard the return movement.

3. In an apparatus for treating slime, the combination of a table pivotally mounted and normally inclined in the direction of flow of the slime and having a bias when shifted to return to normal position, a weight, a support for the weight, and a flexible connection from the weight to the feed end of the table, such connection being longer than the distance between the weight and the table when in washing position.

4. In an apparatus for treating slime, the combination of a table pivotally mounted and normally inclined in the direction of flow of the slime, incrementally varying means for shifting the table from normal position, an automatically acting lock preventing the operation of the table shifting means and means operating to release said lock at the desired intervals.

5. In an apparatus for treating slime, the combination of a pivotally mounted table normally inclined in the direction of flow of the slime, a counter balancing tank connected to the table, means for directing water into said tank, a lock for preventing the downward movement of that tank, and a float arranged in said tank for releasing the lock.

6. In an apparatus for treating slime, the combination of a pivotally mounted table normally inclined in the direction of flow of the slime, means for shifting the table from normal to washing position, means for directing water along the table in a direction opposite that of the flow of the slime, a reservoir having central and end compartments, the end compartments being connected to the water directing means, means for supplying water to the central compartment, valved connections from the central to the end compartments controlled by the table shifting means.

7. In an apparatus for treating slime, the combination of series of oscillating superposed decks, a like series of slime distributing trays, movable aprons adapted to bridge the spaces between the trays and decks, and means operative on the movement of the respective decks to feed position to shift all the aprons to operative relation relative to the decks and trays.

8. In an apparatus for treating slime, the combination of a pivotally mounted table consisting of a plurality of decks, distributing trays, aprons pivotally supported at one end, means carried by the table for raising the aprons to operative position, and apron counter-balancing means increasing in efficiency as the aprons move toward operative position.

9. In a plant for treating slime, the combination of a series of oscillating concentrating tables, means for feeding slime to the tables, incrementally varying means for shifting the tables to and from feed position, and a common means for controlling the feed of slime and the variations of the table operating means.

10. In a plant for treating slime, the combination of a series of oscillating concentrating tables, means for feeding slime to one end of each of the tables, means for directing water onto the other ends of the tables, means for shifting the tables to and from feeding position, and a common means for controlling the feed of slime and dressing water, and the table operating means.

11. In a plant for treating slime, the combination of a series of oscillating tables, means for feeding slime to the tables, means for feeding washing water onto the tailing discharge ends of the tables, means for shifting the tables from feeding to washing position, and means for controlling the flow of slime and water on to the tables and the operation of the table shifting means.

12. In a plant for treating slime, the combination of a series of tables normally inclined in the direction of flow of slime, means for directing water along the tables in a direction opposite that of the flow of the slime, incrementally varying means for oscillating the tables, and common means for controlling the flow of slime and water, and also the variations in the table oscillating means.

13. In a plant for treating slime, the combination of a series of tables normally inclined in the direction of the flow of slime and having a bias to return from washing to normal position, valve controlled means for feeding slime to the tables, movable tanks connected to the tables and adapted when charged to shift them to washing position, means controlled by the tables, for directing washing water along the same, valve controlled means for directing water into the tanks, and means for shifting the valves controlling the flow of slime to the tables and the water to the tanks.

14. In an apparatus for treating slime, the combination of a series of tables normally inclined in the direction of the flow of the slime and having a bias to return from washing to normal position, valve controlled means for feeding slime to the tables, movable tanks connected to the tables and adapted when charged to shift them to washing position, means controlled by the tables for directing washing water along the same, valve controlled means for directing water into the tanks, means for shifting valves controlling the flow of slime and water in one direction and means controlled by the tanks for shifting the valves in the opposite direction.

15. In an apparatus for treating slime, the combination of a series of superimposed oscillating decks, a like series of distributing trays, movable aprons adapted to bridge the spaces between the trays and the decks, a slime box provided with means for directing slime onto the trays, a valve controlling the flow of slime through the box, and mechanism operative on the movements of the decks to shift the aprons relative to the decks and trays, and to open and close the valve controlling the flow of slime.

In testimony whereof, I have hereunto set my hand.

WILLIAM F. DEISTER.

Witnesses:
ALICE A. TRILL,
THOMAS B. JOYCE.

Copies of this patent may be obtained for five cents each, by addressing the "Commissioner of Patents, Washington, D. C."